United States Patent
Fujimoto et al.

(10) Patent No.: US 7,085,671 B2
(45) Date of Patent: Aug. 1, 2006

(54) ABNORMALITY DETECTION APPARATUS OF ENGINE TEMPERATURE ADJUSTING THERMOSTAT

(75) Inventors: Shinya Fujimoto, Hyogo (JP); Norio Matsumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 886 days.

(21) Appl. No.: 09/996,735

(22) Filed: Nov. 30, 2001

(65) Prior Publication Data

US 2002/0188415 A1 Dec. 12, 2002

(30) Foreign Application Priority Data

Jun. 7, 2001 (JP) .................................. 2001-172400

(51) Int. Cl.
*G06F 15/00* (2006.01)

(52) U.S. Cl. .......................... 702/132; 374/1
(58) Field of Classification Search ................. 702/132; 374/1; 392/441; 701/33

See application file for complete search history.

(56) References Cited

U.S. PATENT DOCUMENTS 6,200,021 B1 * 3/2001 Mitsutani et al. .............. 374/1

FOREIGN PATENT DOCUMENTS

| JP | 10-184433 A | 7/1998 |
|---|---|---|
| JP | 11-141337 A | 5/1999 |
| JP | 2000-104549 A | 4/2000 |
| JP | 2000-320389 A | 11/2000 |

* cited by examiner

*Primary Examiner*—John Barlow
*Assistant Examiner*—Xiuqin Sun
(74) *Attorney, Agent, or Firm*—Sughrue Mion, PLLC

(57) ABSTRACT

An abnormality detection apparatus of an engine temperature adjusting thermostat is provided which is capable of accurately grasping the state of an amount of heat generated by an engine to prevent misdetection of abnormality in the thermostat for improved reliabilty. The abnormality detection apparatus includes a heat amount parameter detection section for detecting an operating condition related to an amount of heat generated by the engine as a heat amount parameter (EQ), an abnormality determination section for comparing the temperature of cooling water with a predetermined allowable lower limit to determine abnormality of the thermostat when the heat amount parameter (EQ) reaches a reference heat amount (EQo), a small heat amount determination section for determining whether the amount of heat generated by the engine is in a small amount state, a large heat amount determination section for determining whether the amount of heat generated by the engine is in a large amount state, and an abnormality determination prohibition section for disabling the abnormality determination section when at least one of the small amount state and the large amount state of the amount of heat is determined.

5 Claims, 10 Drawing Sheets

ABNORMALITY DETECTION APPARATUS OF ENGINE TEMPERATURE ADJUSTING THERMOSTAT

This application is based on Application No. 2001-172400, filed in Japan on Jun. 7, 2001, the contents of which are hereby incorporated by reference.

BACKGROUND OF THE INVENTION

1. Field of the Invention

The present invention relates to an abnormality detection apparatus of an engine temperature adjusting thermostat for detecting abnormality in operation of the thermostat which serves to open and close a cooling water circulation passage based on a comparison between the temperature of engine cooling water and a predetermined limit temperature, and more specifically it relates to such an abnormality detection apparatus of an engine temperature adjusting thermostat capable of preventing misdetection for improved reliability.

2. Description of the Related Art

In general, an engine is equipped with a cooling system for maintaining the temperature thereof at a proper level with a thermostat being installed for circulating cooling water through a radiator in accordance With the temperature of the engine (i.e., cooling water temperature).

That is, the thermostat operates in such a manner that it closes a cooling water circulation passage thereby to prohibit cooling water from being circulated through the radiator when the temperature of cooling water is lower than a limit temperature, but opens the cooling water circulation passage thereby to allow cooling water to be circulated through the radiator when the temperature of cooling water rises above the limit temperature.

In the past, such a kind of abnormality detection apparatus of an engine temperature adjusting thermostat is disclosed in Japanese Patent Application Laid-Open No. 11-141337 for instance.

FIG. 12 and FIG. 13 are a basic constructional view and a block diagram of essential portions, respectively, of the known abnormality detection apparatus described in the above publication, these figures illustrating the case in which a thermostat abnormality detection apparatus is applied to an engine cooling system of a motor vehicle.

In FIG. 12, an engine 1 having four cylinders includes a piston 4 in each cylinder 3, a crankshaft 5, and a connecting rod 6 connecting a corresponding piston 4 with the crankshaft 5.

The engine 1 further includes a water jacket 7 arranged to surround the cylinders 3, a radiator 8 having an internal space thereof connected to the water jacket 7, a cooling fan 9, a water pump 10, etc.

With the engine 1 as constructed above and illustrated in FIG. 12, an air fuel mixture in a combustion chamber 11 of each cylinder 3 is combusted and exploded to cause a corresponding piston 4 to reciprocate vertically, so that the reciprocating movement of each piston 4 is transmitted to the crankshaft 5 through the associated connecting rod 6 and it is thereby converted into a rotational driving force of the crankshaft 5.

In addition, an air fuel mixture is supplied from an intake pipe to each cylinder 3 through an inlet port (not shown) and combustion gases are discharged therefrom into an exhaust pipe through an exhaust port (not shown).

The water jacket 7 forming a circulation space for cooling water is arranged in such a manner that it surrounds the outer peripheries of the cylinders 3 in order to cool cylinder heads 12 and cylinder blocks 13 heated by the explosion and combustion of the air fuel mixture and maintain them at a constant temperature.

The radiator 8 is in fluid communication with the cooling water circulation passage of the water jacket 7 through an upper connection passage 14 and a lower connection passage 15. A thermostat 16 is provided on the upper connection passage 14.

The thermostat 16 constitutes a valve which mechanically opens and closes according to the temperature TW of engine cooling water For instance, the thermostat 16 becomes a closed state to close the connection passage 14 when the temperature TW of cooling water is 82° C. or less whereas it becomes an open state to open the connection passage 14 when the temperature TW of cooling water exceeds 82° C.

A water temperature sensor 41 provided in an inner wall of the water jacket 7 detects the temperature TW of cooling water and generates a corresponding detection signal to an electronic control unit (ECU) 51.

Now, reference will be made to the electronic control unit (ECU) 51 which performs control and abnormal diagnosis on the thermostat 16 based on the operating conditions of the engine 1 while referring to FIG. 13.

In FIG. 13, the ECU 51 includes a CPU 52, a ROM 53, a RAM 54, a backup RAM 55, a timer counter 56, etc.

The ECU 51 further includes an external input circuit 57 and an external output circuit 58, which constitute, together with the above elements 52 through 56 and a bus 59 connecting them with one another, a logical operation circuit.

The ROM 53 stores in advance programs related to a variety of driving control, trouble diagnosis, etc, and the RAM 54 temporarily stores the results of logical operations or the like of the CPU 52.

The backup RAM 55 is a nonvolatile RAM which is backed up by a battery for preserving written data even when the ECU 51 is non-active or deenergized (i.e., when the power supply is off).

The timer counter 56 is capable of performing a plurality of counting operations at the same time.

The external input circuit 57 includes a buffer, a filter, an analog to digital converter, a drive circuit, etc.

A throttle sensor 42 detects the opening degree of a throttle valve corresponding to the amount of depression of an accelerator pedal (not shown) by the driver. A rotation sensor 43 detects the rotational speed of the crankshaft 5, that is, the number of revolutions per minute of the engine.

An oxygen sensor 44 detects the density of oxygen in the engine exhaust gas and an intake air pressure sensor 45 detects the intake air pressure (the pressure of intake air), and a vehicle speed sensor 46 detects the running speed of a vehicle. An intake air temperature sensor 47 detects the temperature of intake air (intake air temperature) introduced into an air cleaner (not shown) provided at an inlet end of the intake pipe.

These various sensors 41 through 47 are connected with the external input circuit 57 in the ECU 51 so that the CPU 52 reads in the detection signals of the various sensors 41 though 47 input thereto through the external input circuit 57 as input values.

For instance, the CPU 52 performs various driving control operations such as control of the fuel injection amounts and the fuel injection timing of fuel injectors 48, and trouble diagnosis of the thermostats 16, etc., based on the input values.

The ECU 51 further includes a heat amount parameter detection section for detecting a predetermined operating condition related to the amount of heat generated bey the engine 1 as a heat amount parameter, and an abnormality determination section for determining the presence or absence of abnormality of the thermostat 16 based on the heat amount parameter.

The abnormality determination section in the ECU 51 determines the presence of abnormality in the thermostat 16 (e.g., oversupply of cooling water to the radiator 8) if the temperature TW of cooling water does not reach a predetermined allowable lower limit when the heat amount parameter reaches a reference heat amount after the engine 1 has been started.

In this manner, a determination of abnormality in the thermostat 16 can be made by determining the presence or absence of the cooling action (circulation of cooling water) for a predetermined period of time based on the amount of heat generated by the engine 1 (i.e., the amount of heat for heating cooling water), which is a factor of the rising temperature TW of cooling water.

Particularly, when the warming up of the engine 1 is delayed due to the abnormality of the thermostat 16 (e.g., excessive supply of cooling water to the radiator 8), the combustion state is deteriorated to degrade the components of the exhaust gas at the cold starting of the engine 1, and hence it is necessary to promptly detect abnormality in the thermostat 16 and repair the failure thereof.

Next, reference will be made in more detail to an operation of the ECU 51 for detecting abnormality in the thermostat 16.

First of all, in order to initially set the temperature TWs of cooling water an allowable lower limit (abnormality determination value) T1, etc., the ECU 51 determines, based on an electric signal from a starter switch (not shown), whether the engine 1 is in a starting period (initial state)

When the engine is being started, the ECU 51 reads in the current temperature TW of cooling water based on the detection value from the water temperature sensor 41, and sets the current temperature TW of cooling water as an initial value TWs of the temperature of cooling water (i.e., cooling water temperature at the engine starting).

Thereafter, a reference value (reference heat amount) EQo for determining whether to execute the abnormality detection of the thermostat 16 is calculated from the temperature TWs of cooling water at the starting of the engine 1 based on a map (not shown) stored in the ROM 53.

At this time, the map is formulated in such a manner that the reference heat amount EQo becomes smaller as the cooling water temperature TWs at the starting of the engine 1 is higher. This is because the temperature TW of cooling water rises easily up to a predetermined temperature due to a smaller amount of heat supply if the starting time or initial cooling water temperature TWs is high.

Subsequently, an estimated amount of temperature rise ΔT is calculated by referring to the map based on the starting time (initial) temperature TWs of cooling water.

Here, note that the estimated amount of temperature rise a ΔT represents an estimated amount of temperature rise of the cooling water temperature TW occurring when there is generated a predetermined amount of heat by the engine 1.

Moreover, the relation of the estimated amount of temperature rise ΔT to the starting time cooling water temperature TWs is similar to the relation of the reference heat amount EQo to the starting time cooling water temperature TWs.

After the estimated amount of temperature rise ΔT is added to the starting time cooling water temperature TW's to provide an allowable lower limit T1, which is then temporarily stored in the RAM 54, the ECU 51 determines a proper allowable lower limit T1 suitable for the abnormality detection of the thermostat 16 based on the starting time cooling water temperature TWs.

On the other hand, when the engine 1 is not in a starting period, the latest value of the estimated amount of heat (corresponding to the estimated amount of temperature rise ΔT), which is to be updated upon each fuel injection, is read in, and if this latest value meets the requirement that it is equal to or greater than the reference heat amount EQo, a determination is made as to whether the current temperature TW of cooling water is not less than the allowable lower limit T1.

When TW≧T1, it is determined that the thermostat 16 is in a normal state, whereas when TW<T1, it is determined that the thermostat 16 is in an abnormal state.

In this manner, in the known apparatus illustrated in FIG. 12 and FIG. 13, when the parameter related to the amount of heat generated by the engine 1 (the estimated amount of heat corresponding to the estimated amount of temperature rise ΔT) reaches the reference heat amount EQo, the temperature TW of cooling water is compared with the preset allowable lower limit T1, so that when the temperature TW of cooling water has not yet reached the allowable lower limit T1, it is determined that there is abnormality in the thermostat 16.

Here, the heat amount parameter is an integrated value of the amount of heat generated by the engine (i.e., the amount of heat given to the cooling water), which is estimated from the amount of intake air, etc., related to the combustion of the engine 1.

Accordingly, in the case where the amount of heat generated by the engine per unit time is limited (for instance, during idling operation), the time required until the heat amount parameter reaches the reference heat amount becomes extremely long.

That is, in the case of a small amount of heat generated such as during idling, etc., the time required until the heat amount parameter reaches the reference heat amount becomes long, and hence a long time is required for abnormality determination of the thermostat 16, thus reducing the number of times of abnormality determinations.

In addition, even if the integrated value corrected by the air fuel ratio A/F of a mixture, the vehicle speed, the intake air temperature, etc., is used as the heat amount parameter in order to calculate the amount of heat generated by the engine with high accuracy, abnormality determination at the time of idling operation in which the abnormality determination time becomes longer will be remarkably affected by radiational cooling according to road conditions (frozen road, etc) around the vehicle, and the influence of cooling of the engine 1 due to rain water during traveling in rainy weather.

Therefore, it becomes difficult to accurately estimate the amount of heat (i.e., the amount of heat generated by the engine) given to the cooling water, and hence there is a fear that it might be mistakenly determined that the thermostat 16 is in an abnormal state in spite of the thermostat 16 being actually normal.

On the other hand, the heat amount parameter is an integrated value of the amount of heat generated by the engine estimated from the amount of intake air, etc., so in cases where there is a lot of heat generated per unit time by the engine (for instance, during climbing up a slope, running on a snowy road, etc.), the time required until the heat amount parameter reaches the reference heat amount becomes extremely short.

Moreover, in such a case of traveling with a large amount of heat generation, most of the heat generated by the engine contributes to increasing the temperature TW of cooling water, and hence the cooling water temperature WT rises irrespective of the presence or absence of abnormality in the thermostat 16, whereby it might be incorrectly determined that the thermostat 16 is in a normal state, though the thermostat 16 is in actuality abnormal.

Since the known abnormality detection apparatus of an engine temperature adjusting thermostat calculates the integrated value of the amount of heat generated by the engine as the heat amount parameter, as described above, in cases where the amount of heat generation per unit time is limited such as at the time of idling operation, etc., it takes a long time until the heat amount parameter reaches the reference heat amount, and hence it is easily affected by the cooling condition of the engine. As a result, it becomes difficult to accurately estimate the amount of heat generated by the engine, giving rise to a problem that an incorrect determination of the thermostat 16 being abnormal is made in spite of the fact that the thermostat 16 is actually normal.

In contrast, in cases where the amount of heat per unit time generated by the engine is great, the time required until the heat amount parameter reaches the reference heat amount becomes extremely short, and hence most of the heat generated by the engine contributes to raising the temperature of cooling water. As a result, the temperature of cooling water rises similarly regardless of the abnormality or normality of the thermostat 16, and hence there arises another problem that an incorrect determination is made that the thermostat 16 is normal though the thermostat 16 is actually abnormal.

SUMMARY OF THE INVENTION

The present invention is intended to obviate the problems as referred to above, and has for its object to provide an abnormality detection apparatus of an engine temperature adjusting thermostat which is capable of accurately grasping the state of a heat amount generated by the engine to prevent the misdetection of abnormality in the thermostat for improved reliability by making a determination of a heat amount parameter based on statistical processing.

Bearing the above object in mind, according to the present invention, there is provided an abnormality detection apparatus of an engine temperature adjusting thermostat in which a temperature of cooling water of an engine is compared with a predetermined limit temperature to detect abnormality in operation of the thermostat for opening and closing a cooling water circulation passage of the engine The apparatus includes; a heat amount parameter detection section for detecting an operating condition related to an amount of heat generated by the engine as a heat amount parameter, an abnormality determination section for comparing the temperature of cooling water with a predetermined allowable lower limit to determine abnormality of the thermostat when the heat amount parameter reaches a reference heat amount; a small heat amount determination section for determining whether the amount of heat generated by the engine is in a small amount state, a large heat amount determination section for determining whether the amount of heat generated by the engine is in a large amount state; and an abnormality determination prohibition section for disabling the abnormality determination section when at least one of the small amount state and the large amount state of the amount of heat is determined. With this arrangement, the state of the heat amount generated by the engine is accurately grasped to prevent the misdetection of abnormality in the thermostat, whereby reliability in the abnormality detection apparatus is improved.

In a preferred form of the present invention, the small heat amount determination section determines the small mount state of the heat amount when the heat amount parameter being not greater than a first predetermined value is detected a first predetermined number of times or more within a first predetermined period of time. The large heat amount determination section determines the large amount state of the heat amount when the heat amount parameter being not less than a second predetermined value is detected a second predetermined number of times or more within a second predetermined period of time. Thus, it is possible to accurately grasp the amount of heat generated by the engine to prevent the misdetection of abnormality in the thermostat, thereby improving reliability in the abnormality detection apparatus.

In another preferred form of the present invention, the heat amount parameter detection section detects, as the operating condition, at least one of a plurality of pieces of information including an amount of intake air of the engine, an intake air temperature, a starting time cooling water temperature and a vehicle speed, and associates an integrated value of the operating condition after starting of the engine with the heat amount parameter. Thus, it is possible to further improve reliability in the abnormality detection apparatus.

In a further preferred form of the present invention, the heat amount parameter detection section detects the amount of intake air of the engine as the heat amount parameter The small heat amount determination section compares a first reference intake air amount related to at least one of the starting time cooling water temperature and the intake air temperature of the engine with the amount of intake air of the engine, and determines the small amount state of the heat amount when the amount of intake air being not greater than the first reference intake air amount is detected the first predetermined number of times or more within the first predetermined period of time. The large heat amount determination section compares a second reference intake air amount related to at least one of the starting time cooling water temperature and the intake air temperature of the engine with the amount of intake air of the engine, and determines the large amount state of the heat amount when the amount of intake air being not less than the second reference intake air amount is detected the second predetermined number of times or more within the second predetermined period of time. With this arrangement, the amount of heat generated by the engine can be accurately grasped to prevent the misdetection of abnormality in the thermostat, thereby improving reliability in the abnormality detection apparatus.

In a still further preferred form of the present invention, when the small amount state of the heat amount is determined, the abnormality determination prohibition section prohibits only abnormality determination of the abnormality determination section, but permits normality determination of the abnormality determination section to continue. Thus, an abnormality determination is made only when the temperature of cooling water clearly rises with respect to the amount of heat generated by the engine, thereby making it possible to prevent the misdetection of abnormality in the thermostat in a reliable manner.

In a yet further preferred form of the present invention, when the large amount state of the heat amount is determined, the abnormality determination prohibition section prohibits only normality determination of the abnormality determination section, but permits abnormality determination of the abnormality determination section to continue. Thus, when the temperature of cooling water rises regardless of the abnormal or normal state of the thermostat, a normality determination can be prohibited, thereby making it possible to prevent the misdetection of normality in operation of the thermostat.

The above and other objects, features and advantages of the present invention will become more readily apparent to those skilled in the art from the following detailed description of preferred embodiments of the present invention taken in conjunction with the accompanying drawings

DESCRIPTION OF THE PREFERRED EMBODIMENTS

Now, preferred embodiments of the present invention will be described in detail while referring to the accompanying drawings.

Embodiment 1.

Figure 1:
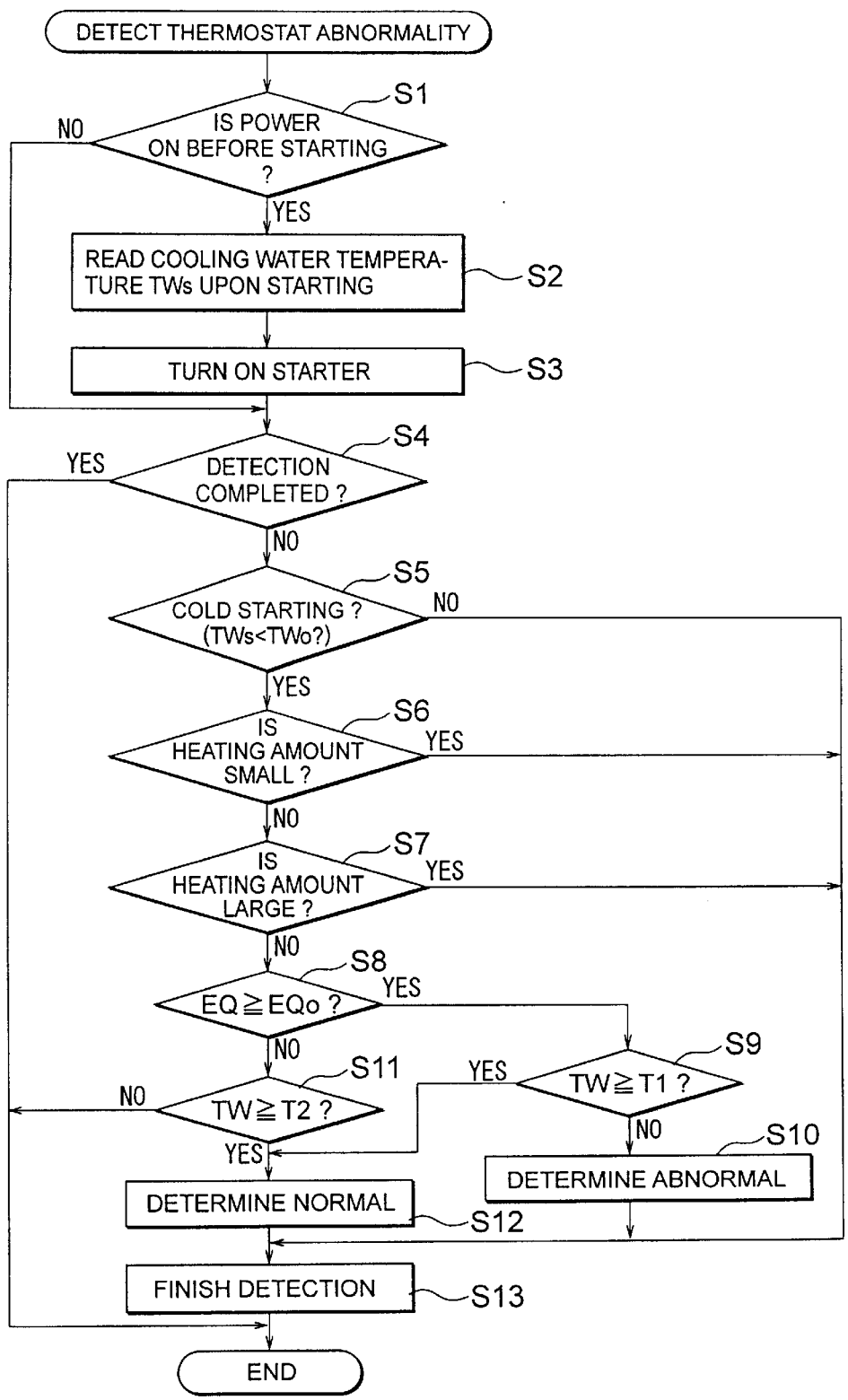
FIG. 1 is a flow chart illustrating abnormality determination processing according to a first embodiment of the present invention.

FIG. 1 is a flow chart showing an abnormality detection operation for an engine temperature adjusting thermostat according to a first embodiment of the present invention.

Figure 12:
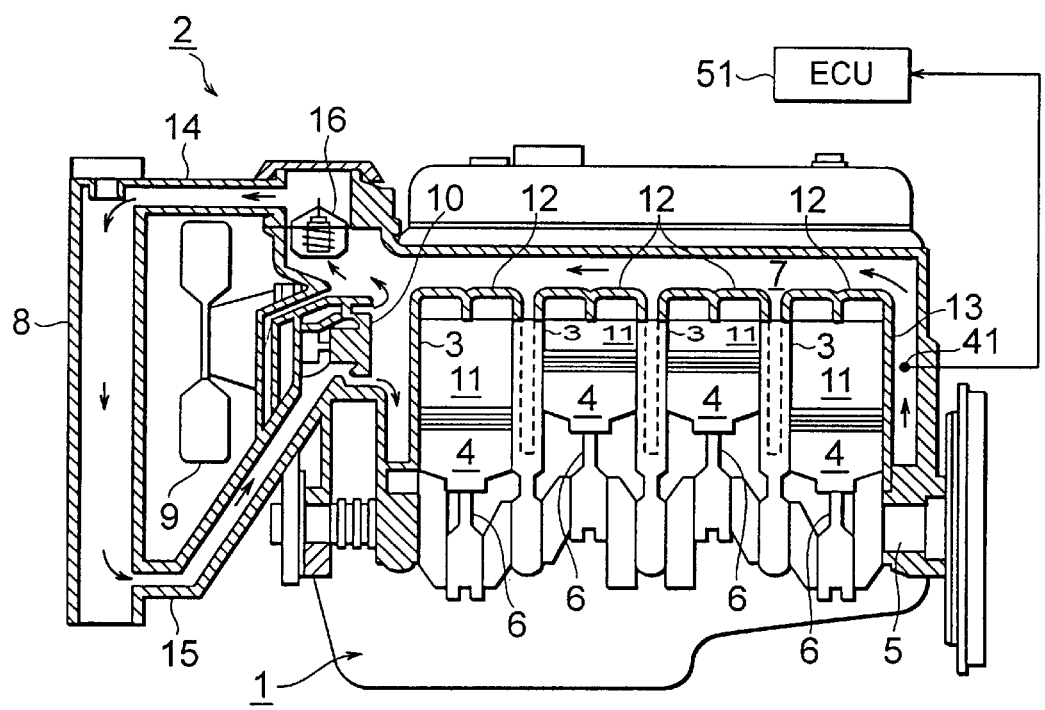
FIG. 12 is a constructional view of an engine temperature adjusting thermostat adapted to be used with both the present invention and the prior art.
Figure 13:
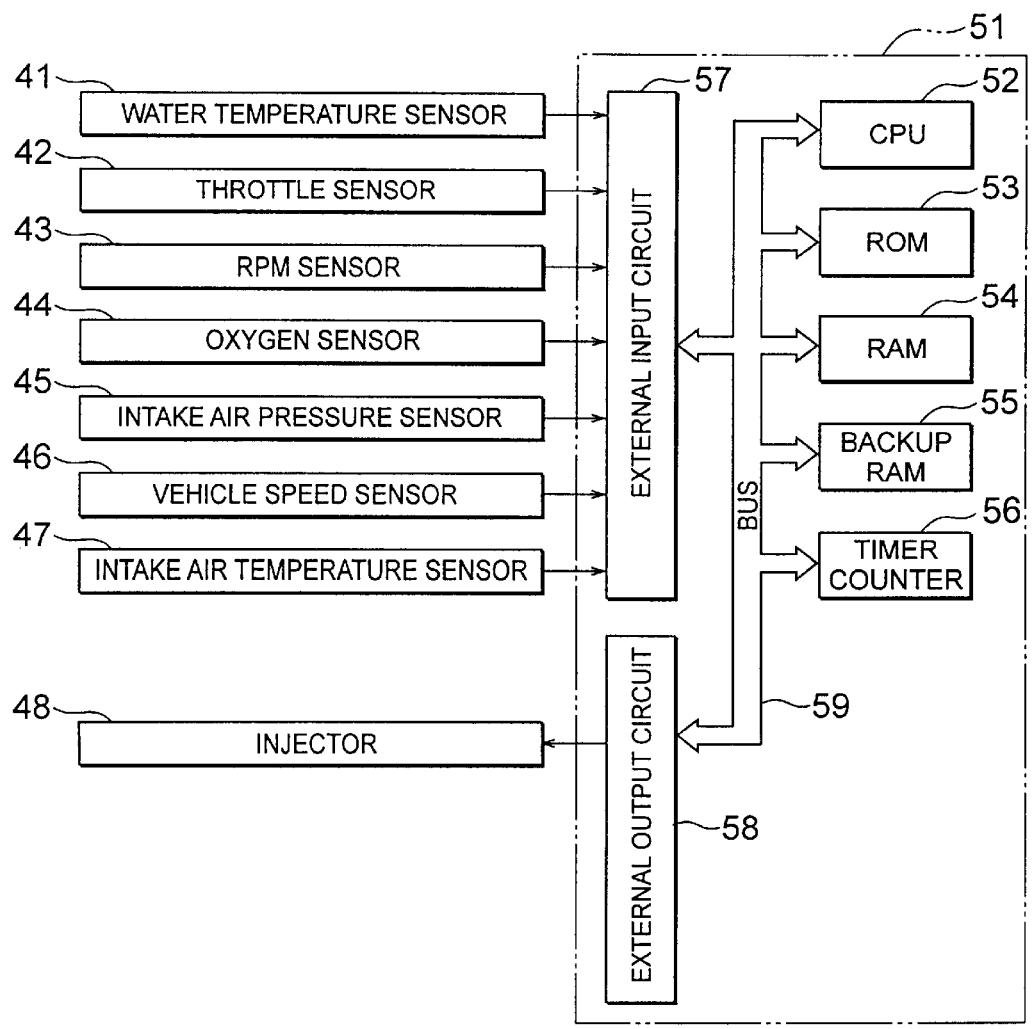
FIG. 13 is a block diagram illustrating the functional configuration of an ECU in FIG. 12.

An abnormality detection apparatus of an engine temperature adjusting thermostat according to the first embodiment of the present invention is substantially similar in the basic configuration to the above-mentioned known one (see FIG. 12 and FIG. 13), but is different therefrom in part of the processing program in the ECU 51 (see FIG. 13)

In the present invention, the ECU 51 includes, as the same functional configuration as in the above-mentioned known one, a heat amount parameter detection section for detecting an operating condition related to the amount of heat generated by an engine 1 (see FIG. 12) as a heat amount parameter EQ, and an abnormality determination section for determining whether the thermostat 16 is abnormal, by comparing the temperature TW of cooling water with a predetermined allowable lower limit T1 when the heat amount parameter EQ reaches a reference heat amount EQo.

In addition, the ECU 51 further includes a small heat amount determination section for determining whether the amount of heat generated by the engine is in a small amount state, a large heat amount determination section for determining whether the amount of heat generated by the engine is in a large amount state, and an abnormality determination prohibition section for disabling the abnormality determination section when at least one of the small amount state and the large amount state of heat generation is determined.

The small heat amount determination section and the large heat amount determination section in the ECU 51 serve to determine, based on statistical processing as described later, whether the amount of heat generated by the engine is in a small amount state or in a large amount state, respectively.

The heat amount parameter detection section in the ECU 51 detects, as an operating condition, at least one of a plurality of pieces of information including an intake air amount Oa of the engine 1, an intake air temperature TA, a starting time cooling water temperature TWs and a vehicle speed SPD, and associates an integrated value of the operating condition thus detected after starting of the engine 1 with the heat amount parameter EQ.

In FIG. 1, first of all, with an on state of the power supply of the vehicle (i.e., with the ignition key being turned on), it is determined whether the engine 1 has not yet been started (a starter is in an off state) (step S1), and when it is determined that the engine 1 has been started (i.e., NO), the control process directly proceeds to step S4 which is to be described later.

On the other hand, when it is determined in step S1 that the engine 1 has not yet been started with the power supply being in an on state (i.e., YES), the starting time cooling water temperature TWs is read in (step S2)

Then, when the engine 1 is started by the starter being turned on (step S3), a determination is made as to whether the detection of various kinds of information indicative of then operating condition of the engine 1 has been completed (step S4).

When it is determined in step S4 that the detection of the engine operating condition has not yet been completed (i.e., NO), the processing routine of FIG. 1 is ended.

On the other hand, when it is determined in step S4 that the detection has been completed (i.e., YES), whether the engine 1 is in a cold starting state is then determined depending on whether the starting time cooling water temperature TWs is lower than a predetermined warming up temperature TWo (step S5).

When determined in step S5 as TWs≧TWo (i.e., NO), the control process directly proceeds to step S13 (to be described later), whereas when determined in step S5 as TWs<TWo (i.e., YES), the heat amount parameter of the engine 1 is detected or calculated, and the state of the heat amount generated by the engine is determined (steps S6 and S7).

First, a determination is made as to whether the amount of heat is in a small amount state (step S6), and when the heat amount is determined to be in the small amount state, the control process proceeds to step S13, but when determined not to be in the small amount state (i.e., NO), it is further determined whether the amount of heat is in a large amount state (step S7).

When the heat amount is determined to be in the large amount state in step S7 (i.e., YES), the control process proceeds to step S13, whereas when determined not to be in the large amount state in step S7 (i.e., NO), it is further determined whether the heat amount parameter EQ of the engine 1 is not less than the predetermined reference heat amount EQo (step S8).

When determined in step S8 as EQ≧EQo (i.e., YES), a determination is then made as to whether the temperature TW of cooling water at that time is not less than the allowable lower limit T1 (step S9).

Contrarily, when determined in step S9 as TW<T1 (i.e., NO), there is an abnormal state in which the engine temperature (i.e., cooling water temperature TW) is low despite the fact that there is a predetermined amount of heat generated by the engine at the time of cold engine starting. Accordingly, it is determined that the thermostat 16 is abnormal (step S10), and the detection of an abnormal state is ended (step S13).

On the other hand, when it is determined in step S8 as EQ<EQo (i.e., NO), it is further determined whether the temperature TW of cooling water at that time is not less than a predetermined temperature T2 (T2<T1) (step S11).

When determined in step S11 as TW<T2 (i.e., NO), the processing routine of FIG. 1 is ended at once, whereas when determined in step S11 as TW≧T2 (i.e., YES), it is determined that the thermostat 16 is normal (step S12) and the detection of a normal state is completed (step S13), ending the processing routine of FIG. 1.

When determined in step S9 as TW≧T1 (i.e., YES), the control process proceeds to step S12 where it is determined that the thermostat 16 is normal.

Figure 2:
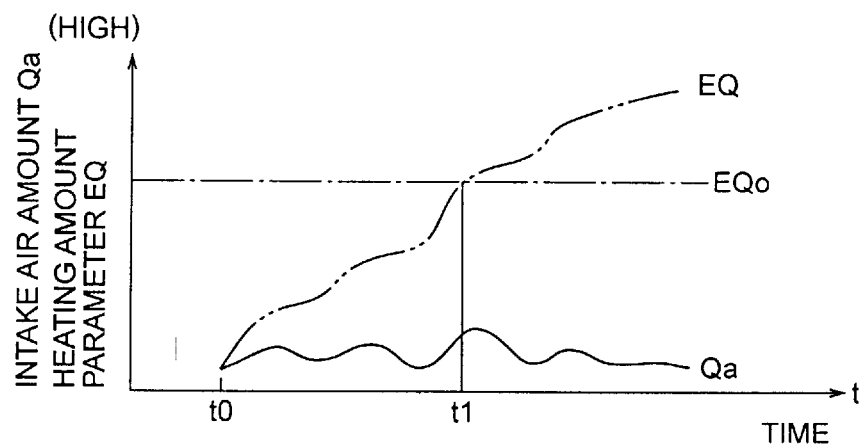
FIG. 2 is an explanatory view illustrating the characteristic of a heat amount parameter with respect to the amount of intake air, applied to the first embodiment of the present invention.

FIG. 2 illustrates a change over time of the heat amount parameter EQ related to the step S8 in FIG. 1, in which the relation of the heat amount parameter EQ to the intake air amount Qa of the engine 1 is shown.

In FIG. 2, the solid line represents a change over time of the amount of intake air Qa; the alternate long and two short dashes line represents a change over time of the heat amount parameter EQ; and the alternate long and short dash line represents the reference heat amount EQo, respectively.

Here, note that there is shown the case where the heat amount parameter EQ reaches the reference heat amount EQo at time t1.

Figure 3:
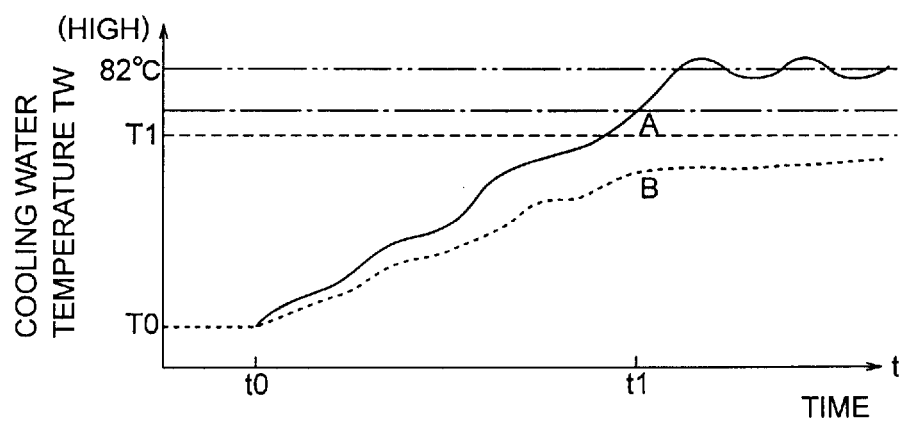
FIG. 3 is an explanatory view illustrating a change over time in the temperature of cooling water used for abnormality determination according to the first embodiment of the present invention.

FIG. 3 illustrates a change over time of the temperature TW of cooling water in the normal and abnormal operations of the thermostat according to the first embodiment of the present invention, this figure being related to the step S9 in FIG. 1.

In FIG. 3, the solid line represents a change over time of the temperature TW of cooling water when the thermostat 16 is normal; the dotted line represents a change over time of the temperature TW of cooling water when the thermostat 16 is abnormal; and the broken line represents the allowable lower limit T1, respectively.

In this case, when the temperature TW of cooling water is at a normal value A (A≧T1) at time t1 at which the heat amount parameter EQ reaches the reference heat amount EQo, it is determined that the thermostat 16 is normal, whereas when the temperature TW of cooling water is at an abnormal value B (B<T1) at time t1, it is determined that the thermostat 16 is abnormal.

Next, reference will be made to the calculation processing of the heat amount parameter EQ according to the first embodiment of the present invention while referring a flow chart of FIG. 4 as well as explanatory views of FIG. 5 and FIG. 6.

Figure 6:
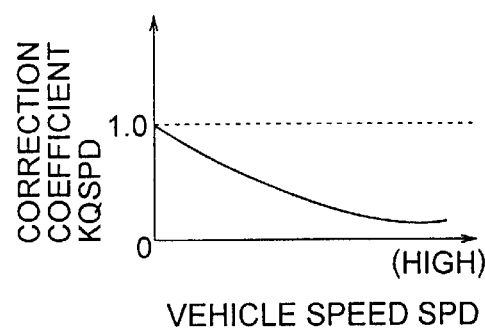
FIG. 6 is an explanatory view illustrating the characteristic of a correction factor with respect to the vehicle speed, applied to the first embodiment of the present invention.

FIG. 6 illustrates the characteristic of the heat amount reference value EQb with respect to the amount of intake air Qa, which is in advance stored as map data in the ECU 51.

Figure 5:
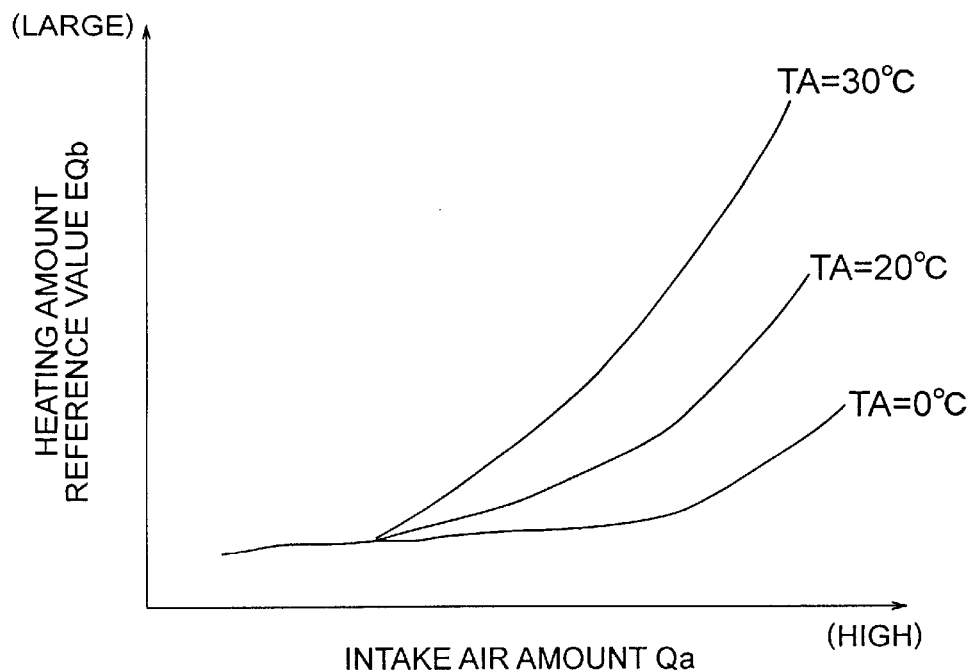
FIG. 5 is an explanatory view illustrating the characteristic of a heat amount reference value with respect to the amount of intake air, applied to the first embodiment of the present invention.

In FIG. 5, respective characteristic curves are given according to different intake air temperatures TA (0° C., 20° C., 30° C.), respectively.

FIG. 6 illustrates the characteristic of a correction factor KQSPD with respect to the heat amount parameter EQ, which is in advance stored as map data in the ECU 51.

In FIG. 6, the correction factor KQSPD is set within the range of 0–1 according to the vehicle speed SPD.

Figure 4:
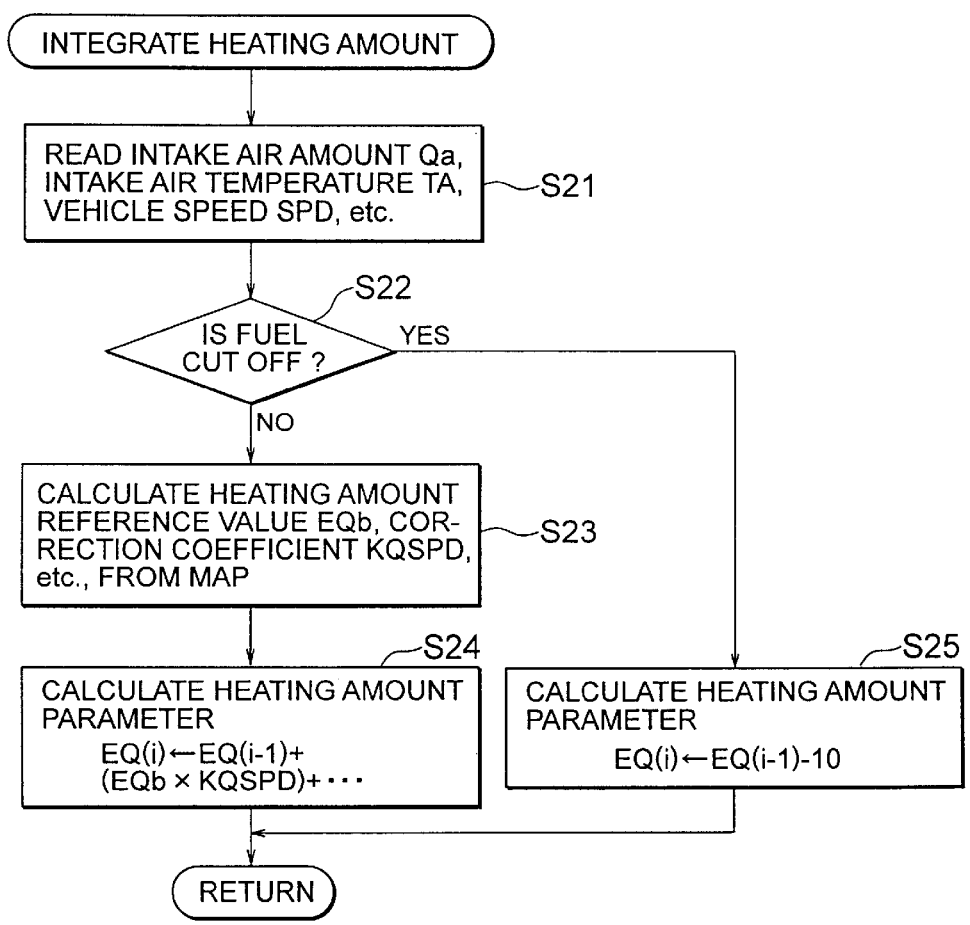
FIG. 4 is a flow chart illustrating arithmetic processing of the heat amount parameter applied to the first embodiment of the present invention

In FIG. 4, first of all, the ECU 51 (see FIG. 13) reads in the amount of intake air Qa, the intake air temperature TA, the vehicle speed SPD, etc., as operating condition information from various sensors (step S21).

Subsequently, it is determined as to whether the control state of the engine 1 is in the course of fuel cut-off or fuel injection (step S22), and when it is determined that the engine 1 is during fuel injection (i.e., NO), the reference value EQb of the amount of heat due to combustion and the correction factor KQSPD corresponding to the vehicle speed SPD are calculated from the map data stored, as shown in FIG. 5 and FIG. 6 (step S23).

Then, a current heat amount parameter EQ(i) is calculated according to the following expression (1) by using the heat amount reference value EQb and the correction factor KQSPD (map data values) (step S24), and the processing routine of FIG. 4 is exited.

$$EQ(i)=EQ(i-1)+(EQb \times KQSPD) \qquad (1)$$

where EQ(i−1) is a heat amount parameter calculated last time In addition, though not described here, it goes without saying that if there is map data corresponding to other operating conditions, such data will be added to expression (1) above for correction as necessary.

On the other hand, when it is determined in step S22 that the engine 1 is under fuel cut-off control (i.e., YES), combustion does not take place and hence the current heat amount parameter EQ(i) is calculated according to the following expression (2) while taking into consideration that the amount of heat decreases in accordance with the time lapse (step S25), and the processing routine of FIG. 4 is exited.

$$EQ(i)=EQ(i-1)-10 \qquad (2)$$

In expression (2) above, the amount of decrease with respect to the heat amount parameter EQ according to the time lapse (operation cycle) is typically set to "10".

Now, reference will be made concretely to the engine heat amount state determination processing related to the steps S6 and S7 in FIG. 1 while referring to a flow chart of FIG. 7.

Figure 7:
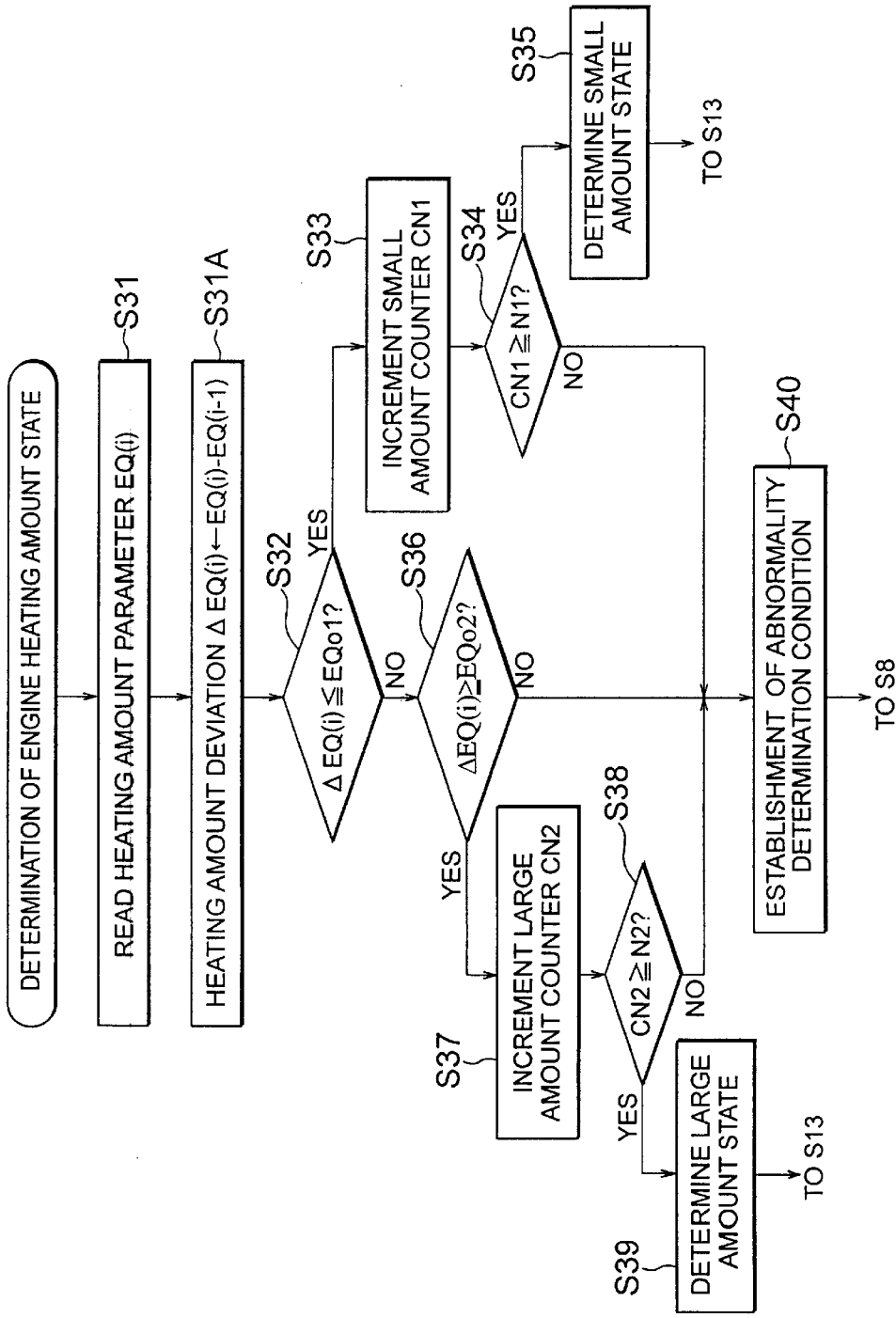
FIG. 7 is a flow chart illustrating heat amount state determination processing according to the first embodiment of the present invention.

The processing of FIG. 7 starts while branching from the determination of "YES" in step S5 (see FIG. 1) and proceeds to step 88 or step S13.

Though not illustrated here, provision is made for timer counters which are incremented every execution (operation) cycle of FIG. 7, and cleared each time a predetermined period of time (or a predetermined number of operations) elapses. Each counter in FIG. 7 is made effective with the operation within the predetermined time.

In FIG. 7, the current heat amount parameter EQ(i) is first read in (step S31), and a heat amount deviation $\Delta EQ(i)$ ($\Delta EQ(i)=EQ(i)-EQ(i-1)$) between the current heat amount parameter $\Delta EQ(i)$ and the last heat amount parameter $EQ(i-1)$ is calculated (step S31A), and it is determined whether the heat amount deviation $\Delta EQ(i)$ is not greater than a first predetermined value EQo1 (step S32).

When it is determined in step S32 as $\Delta EQ(i) \leq EQo1$ (i.e., YES), a small amount counter CN1 is incremented (step S33), and it is determined whether the value of the small amount counter CN1 is not less than a first predetermined counter value N1 (step S34).

When determined in step S34 as $CN1 \geq N1$ (i.e., YES), it is found that the heat amount deviation $\Delta EQ(i)$, which is not greater than the first predetermined value EQo1, has been detected N1 times or more within a predetermined period of time, so it is determined that the amount of heat generated by the engine is in a small amount state (step S35), and the control process proceeds to step S13 in FIG. 1.

On the other hand, when it is determined in step S34 as CN1<N1 (i.e., NO), it is found that the number of detections of the heat amount deviation $\Delta EQ(i)$ being not greater than the predetermined value EQo1 is less than N1, and hence it is regarded that the abnormality determination condition is established (step S40), then the control process proceeds to step S8 in FIG. 1.

On the other hand, when it is determined in step S32 as a $\Delta EQ(i)>EQo1$ (i.e., NO), it is further determined whether the current heat amount deviation $\Delta EQ(i)$ is not less than a second predetermined value EQo2 (EQo2>EQo1) (step S36).

When determined in step S36 as $\Delta EQ(i) \geq EQo2$ (i.e., YES), a large amount counter CN2 is incremented (step S37) and it is determined whether the value of the large amount counter CN2 is not less than a second predetermined counter value N2 (step S38).

Here, note that the first and second predetermined counter values N1, N2 are set to minimum values within a range where the result of abnormality determination of the thermostat measured with the actual vehicle is not misjudged That is, the first predetermined counter value N1 is set to such a minimum value as to prevent an incorrect determination particularly when the thermostat is normal, which would otherwise be caused in cases where the heat amount deviation $\Delta EQ(i)$ is not greater than the first predetermined value EQo1 in spite of the thermostat being normal, thus incorrectly determining that the thermostat is abnormal. Also, the second predetermined counter value N2 is set to such a minimum value as to prevent an incorrect determination particularly when the thermostat is abnormal, which would otherwise be caused in cases where the heat amount deviation $\Delta EQ(i)$ does not exceed the second predetermined value EQo2 in spite of the thermostat being abnormal (i.e., a cooling water circulation control valve is fixed open), thus incorrectly determining that the thermostat is normal.

For instance, the second predetermined counter value N2 can be set to be greater than the first predetermined counter value N1.

When it is determined in step S38 as $CN2 \geq N2$ (i.e., YES), the heat amount deviation $\Delta EQ(i)$ being not less than the second predetermined value EQo2 has been detected N2 times or more within a predetermined period of time, so it is determined that the amount of heat generated by the engine is in a large amount state (step S39), and the control process proceeds to step S13 in FIG. 1.

Contrarily, when determined in step S38 as CN2<N2 (i.e., NO), the number of detections of the heat amount deviation $\Delta EQ(i)$ being not less than the predetermined value EQo2 is less than N2, and hence it is regarded that the abnormality determination condition is established (step S40), then the control process proceeds to step S8 in FIG. 1.

In this manner, by statistically integrating the number of detections of the heat amount deviation $\Delta EQ(i)$ and finally determining the state of the amount of heat generated by the engine, it is possible to improve reliability in the results of determination of the small amount state or the large amount state.

Moreover, at the cold starting of the engine 1, an abnormality determination of the thermostat 16 is made only in an intermediate state of the heat amount deviation $\Delta EQ$ in which the heat amount deviation $\Delta EQ$ is not in a small amount state and in a large amount state, thereby making it possible to further improve reliability in the abnormality determination.

Embodiment 2.

Although in the above-mentioned first embodiment, the abnormality determination prohibition steps S6 and S7 (establishment of the determination condition) are performed prior to the step S8 of determining the heat amount parameter EQ, misdetection prevention (abnormality determination prohibition) processing may be finally carried out in the abnormality determination step S10 and the normality determination step S12.

In this case, only either one of the abnormality determination processing and the normality determination processing can be prohibited in each step S10 or S12.

Hereinafter, reference will be made to the second embodiment of the present invention in which abnormality determination prohibition processing is executed in the last steps S10 and S12, while referring to FIG. 8 through FIG. 11.

Here, there is shown the case in which the amount of intake air Qa is associated with the heat amount parameter EQ, and only either one of the abnormality determination processing and the normality determination processing is prohibited according to the amount of intake air Qa.

In this case, the heat amount parameter detection section in the ECU 51 detects the amount of intake air Qa of the engine 1 as an operating condition related to the heat amount parameter EQ.

In addition, the small heat amount determination section compares the amount of intake air Qa of the engine 1 with a low intake air amount determination value Qo1 related to at least one of the starting time cooling water temperature TWs of the engine 1 and the intake air temperature TA, and determines that the heat amount is in a small amount state when the amount of intake air Qa being not greater than the low intake air amount determination value Qo1 is detected a first predetermined number of times QN1 or more within a first predetermined period of time.

Also, the large heat amount determination section compares the amount of intake air Qa of the engine 1 with a high intake air amount determination value Qo2 related to at least one of the starting time cooling water temperature TWs of the engine 1 and the intake air temperature TA, and determines that the heat amount is in a large amount state when the amount of intake air Qa being not less than the high intake air amount determination value Qo2 is detected a second predetermined number of times QN2 or more within a second predetermined period of time.

In addition, when the heat amount is determined to be in a small amount state, the abnormality determination prohibition section prohibits only the abnormality determination of the abnormality determination section, but permits the normal determination of the abnormality determination section to continue, whereas when the heat amount is determined to be in a large amount state, the abnormality determination prohibition section prohibits only the normal determination of the abnormality determination section, but permits the abnormality determination of the abnormality determination section to continue.

Figure 8:
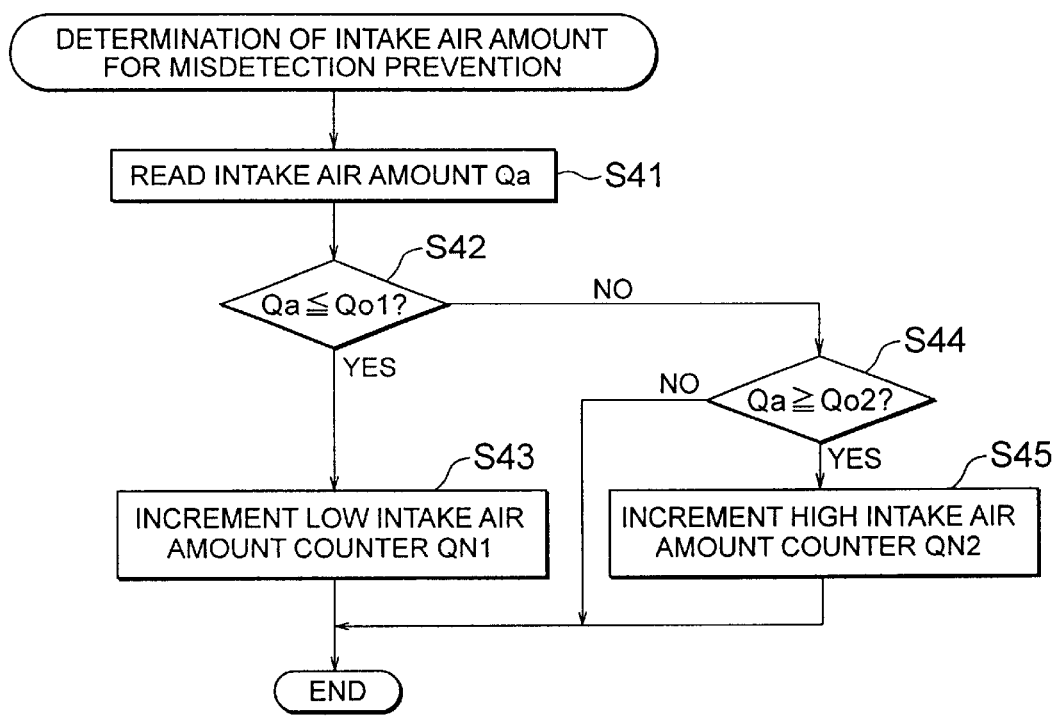
FIG. 8 is a flow chart illustrating counter processing for intake air amount state determination according to a second embodiment of the present invention.

FIG. 8 shows a flow chart of a counter processing for determination of the amount of intake air according to the second embodiment of the present invention, illustrating the case in which a low intake air amount counter QN1 or a high intake air amount counter QN2 is incremented according to the amount of intake air Qa.

Figure 9:
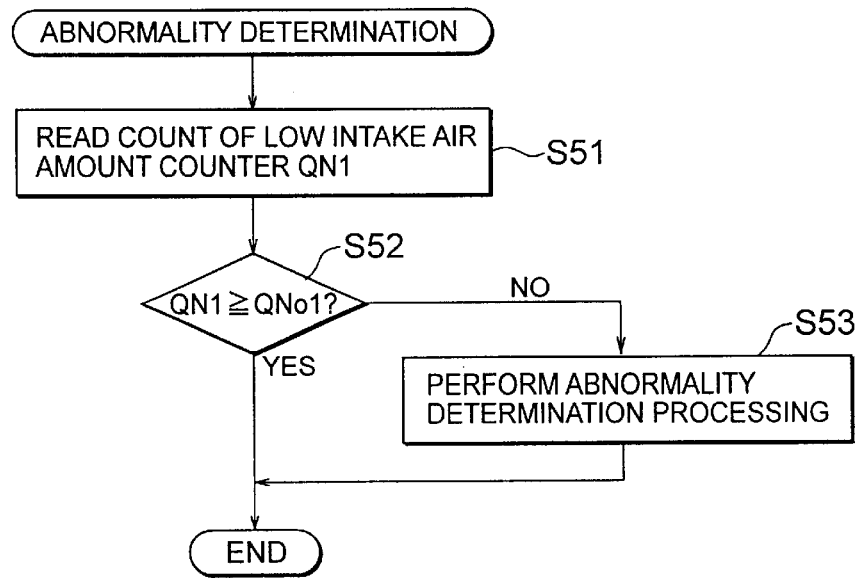
FIG. 9 is a flow chart illustrating abnormality determination processing according to the second embodiment of the present invention.

FIG. 9 shows a flow chart of abnormality determination processing according to the second embodiment of the present invention, which corresponds to step S10 in FIG. 1.

Figure 10:
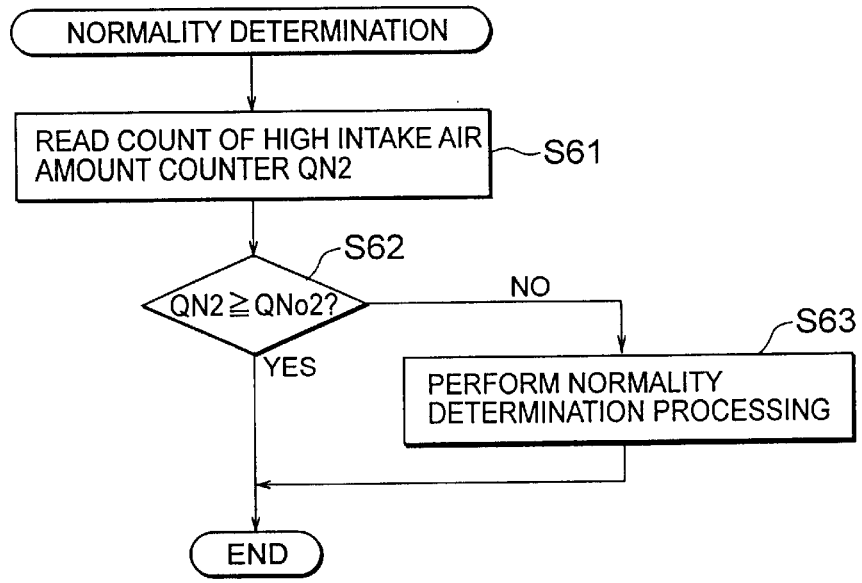
FIG. 10 is a flow chart illustrating normality determination processing according to the second embodiment of the present invention.

FIG. 10 shows a flow chart of normality determination processing according to the second embodiment of the present invention, which corresponds to step S12 in FIG. 1.

Figure 11:
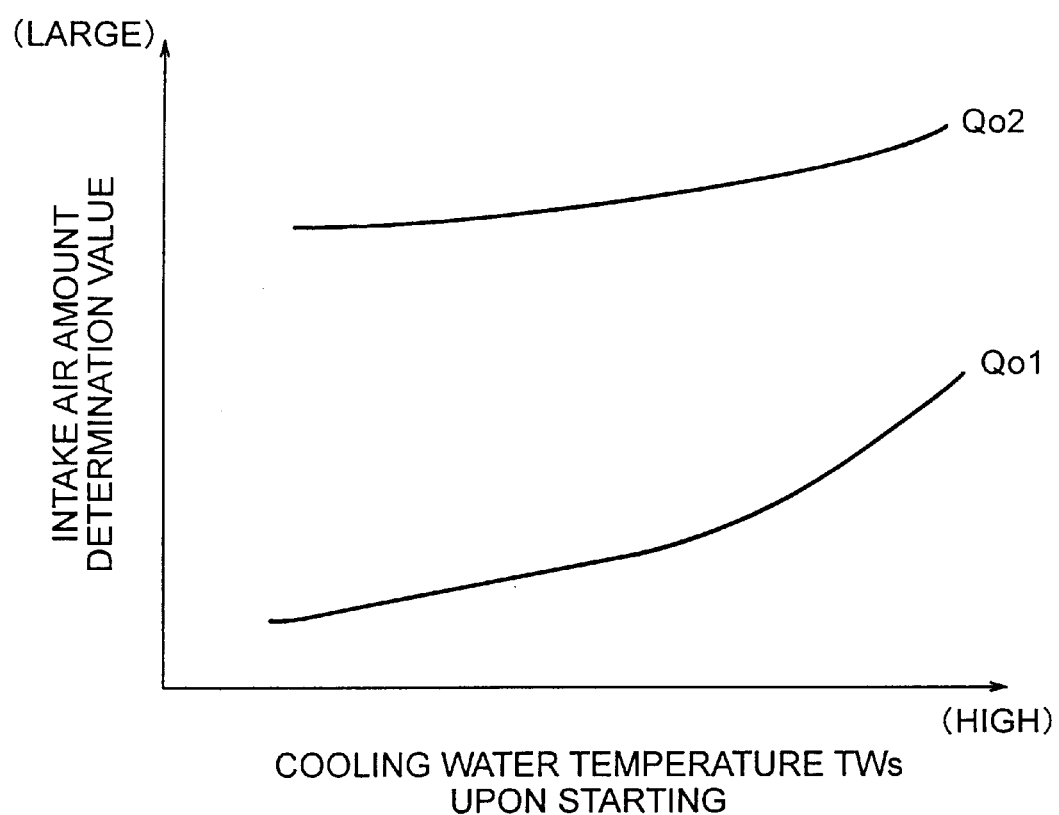
FIG. 11 is an explanatory view illustrating the characteristic of an intake air amount determination value with respect to a starting time cooling water temperature applied to the second embodiment of the present invention.

FIG. 11 illustrates the low intake air amount determination value Qo1 and the high intake air amount determination value Qo2 used in the processing of FIG. 8.

In FIG. 11, each of the intake air amount determination values Qo1 and Qo2 is set as map data value in accordance with the starting time cooling water temperature TWs.

That is, the low intake air amount determination value Qo1 and the high intake air amount determination value Qo2 are set to be increasing as the starting time cooling water temperature TWs rises.

In addition, the low intake air amount determination value Qo1 is generally set to be lower than the high intake air amount determination value Qo2.

In FIG. 8, first of all, the amount of intake air Qa is read in (step S41), and it is determined whether the amount of intake air Qa is not greater than the low intake air amount determination value Qo1 (step S42). When determined as Qa≦Qo1 (i.e., YES), the low intake air amount counter QN1 is incremented (step S43) and the processing routine of FIG. 8 is ended.

On the other hand, when determined in step S42 as Qa>Qo1 (i.e., NO), it is further determined as to whether the amount of intake air Qa is not less than the high intake air amount determination value Qo2 (Qo2>Qo1) (step 844)

When determined in step S44 as Qa≧Qo2 (i.e., YES), the high intake air amount counter QN2 is incremented (step S45), and the processing routine of FIG. 8 is ended. On the other hand, when determined as Qa<Qo2 (i.e., NO), the processing routine of FIG. 8 is ended at once.

Thus, the values of the respective counters QN1 and QN2 representing the statistical states (low intake air amounts) of the intake air amount Qa are set in real time, and the respective counter values are used in the processing of FIG. 9 and FIG. 10.

In the abnormality determination processing of FIG. 9, the value of the low intake air amount counter QN1 is first read in (step S51), and then it is determined whether the value of the low intake air amount counter QN1 is not less than a first predetermined counter value QNo1 (step S52).

When it is determined in step S52 as QN1<QNo1 (i.e., NO), it is found that the number of detections of the amount of intake air Qa being not greater than the low intake air amount determination value Qo1 is less than QNo1, and hence the heat amount is not in a small amount state. Thus, the processing for determining abnormality of the thermostat 16 is executed (step S53), and the processing routine of FIG. 9 is ended.

On the other hand, when it is determined in step S52 as QN1≧QNo1 (i.e., YES), the amount of intake air Qa being not greater than the low intake air amount determination value Qo1 has been detected a number of times QNo1 or more, and hence the amount of heat generated by the engine is in a small amount state. As a result, the abnormality determination processing is prohibited and the processing routine of FIG. 9 is ended at once.

Moreover, in the normality determination processing of FIG. 10, the value of the high intake air amount counter QN2 is first read in (step S61), and it is determined whether the value of the high intake air amount counter QN2 is not less than a second predetermined counter value QNo2 (step S62).

When it is determined in step S62 as QN2<QNo2 (i.e., NO), the number of detections of the intake air amount Qa being not less than the high intake air amount determination value Qo2 is less than QNo2, and hence the amount of heat generated by the engine is not in a large amount state, as a consequence of which the processing of determining normality of the thermostat 16 is executed (step S63), and the processing routine of FIG. 10 is ended.

On the other hand, when determined in step S62 as QN2≧QNo2 (i.e., YES), the amount of intake air Qa being not less than the high intake air amount determination value Qo2 has been detected a number of times QNo2 or more, and hence the amount of heat generated by the engine is in a large amount state. Accordingly, the normality determination processing is prohibited and the processing routine of FIG. 10 is ended at once.

In this manner, either abnormality determination or normality determination can be prohibited based on the amount of intake air Qa.

That is, an abnormality determination of the thermostat 16 is made only with the situation in which the temperature TW of cooling water clearly rises with respect to the amount of heat generated by the engine 1 being established as an abnormality determination condition (i.e., when the amount of heat generated by the engine is not in a small amount state), so it is possible to prevent misdetection of abnormality in a reliable manner.

In addition, since the execution of normality detection of the thermostat 16 is prohibited under the situation in which the temperature TW of cooling water rises regardless of the abnormality or normality of the thermostat 16 (i.e., when the amount of heat generated by the engine is in a large amount state), it is possible to prevent the misdetection of normality in a reliable manner.

Moreover, the misdetection of normality or abnormality can be reliably prevented by performing statistical timer processing of the intake air amount determination counter values QN1, QN2, as shown in FIG. 8.

Further, by setting the low and high determination values Qo1 and Qo2 for the amount of intake air Qa according to the starting time cooling water temperature TWs, as shown in FIG. 11, it is possible to accurately determine the state of the intake air amount (the state of the amount of heat generated).

Still further, the low intake air amount determination value Qo1 is set to be lower than me high intake air amount determination value Qo2, so that the low intake air amount state and the high intake air amount state can be determined more accurately.

Here, note that the respective predetermined counter values QNo1. QNo2 used in the processing of FIG. 9 and FIG. 10 may be variably set according to the starting time cooling water temperature TWs, similar to the low and high intake air amount determination values Qo1, Qo2 used in the processing of FIG. 8.

While the invention has been described in terms of preferred embodiments, those skilled in the art will recognize that the invention can be practiced with modifications within the spirit and scope of the appended claims.

What is claimed is:

1. An abnormality detection apparatus of an engine temperature adjusting thermostat in which a temperature of cooling water of an engine is compared with a predetermined limit temperature to detect abnormality in operation of said thermostat for opening and closing a cooling water circulation passage of said engine, said apparatus comprising:

a heat amount parameter detection section for detecting an operating condition related to an amount of heat generated by said engine as a heat amount parameter;

an abnormality determination section for comparing said temperature of cooling water with a predetermined allowable lower limit to determine abnormality of said thermostat when said heat amount parameter reaches a reference heat amount;

a small heat amount determination section for determining whether the amount of heat generated by said engine is in a small amount state;

a large heat amount determination section for determining whether the amount of heat generated by said engine is in a large amount state; and an abnormality determination prohibition section for disabling said abnormality determination section when at least one of the small amount state and the large amount state of said amount of heat is determined, wherein said heat amount parameter detection section detects the amount of intake air of said engine as said heat amount parameter;

said small heat amount determination section compares a first reference intake air amount related to at least one of said starting time cooling water temperature and said intake air temperature of said engine with the amount of intake air of said engine, and determines said small amount state of said heat amount when the amount of intake air being not greater than said first reference intake air amount is detected said first predetermined number of times or more within said first predetermined period of time; and said large heat amount determination section compares a second reference intake air amount related to at least one of said starting time cooling water temperature and said intake air temperature of said engine with the amount of intake air of said engine, and determines the large amount state of said heat amount when the amount of intake air being not less than said second reference intake air amount is detected said second predetermined number of times or more within said second predetermined period of time.

2. The abnormality detection apparatus of an engine temperature adjusting thermostat according to claim 1, wherein said small heat amount determination section determines said small mount state of said heat amount when said heat amount parameter being not greater than a first predetermined value is detected a first predetermined number of times or more within a first predetermined period of time, and said large heat amount determination section determines said large amount state of said heat amount when said heat amount parameter being not less than a second predetermined value is detected a second predetermined number of times or more within a second predetermined period of time.

3. The abnormality detection apparatus of an engine temperature adjusting thermostat according to claim 1, wherein said heat amount parameter detection section detects, as said operating condition, at least one of a plurality of pieces of information including an amount of intake air of said engine, an intake air temperature, a starting time cooling water temperature and a vehicle speed, and associates an integrated value of said operating condition after starting of said engine with said heat amount parameter.

4. The abnormality detection apparatus of an engine temperature adjusting thermostat according to claim 1, wherein when the small amount state of said heat amount is determined, said abnormality determination prohibition section prohibits only abnormality determination of said abnormality determination section, but permits normality determination of said abnormality determination section to continue.

5. The abnormality detection apparatus of an engine temperature adjusting thermostat according to claim 1, wherein when the large amount state of said heat amount is determined, said abnormality determination prohibition section prohibits only normality determination of said abnormality determination section, but permits abnormality determination of said abnormality determination section to continue.

* * * * *